United States Patent
Benezra

(10) Patent No.: US 12,078,708 B2
(45) Date of Patent: Sep. 3, 2024

(54) ACOUSTIC HORN PHASED ARRAY

(71) Applicant: Moshe Benezra, Elmsford, NY (US)

(72) Inventor: Moshe Benezra, Elmsford, NY (US)

(*) Notice: Subject to any disclaimer, the term of this patent is extended or adjusted under 35 U.S.C. 154(b) by 0 days.

(21) Appl. No.: 17/483,779

(22) Filed: Sep. 23, 2021

(65) Prior Publication Data

US 2022/0091215 A1    Mar. 24, 2022

Related U.S. Application Data

(60) Provisional application No. 63/082,910, filed on Sep. 24, 2020.

(51) Int. Cl.
- *G01S 1/80* (2006.01)
- *G01S 15/32* (2006.01)
- *H04R 3/00* (2006.01)

(52) U.S. Cl.
CPC ............ *G01S 1/805* (2013.01); *G01S 15/325* (2013.01); *H04R 3/005* (2013.01)

(58) Field of Classification Search
CPC ...... G01S 1/805; G01S 15/325; G01S 3/8083; H04R 3/005; H04R 1/30; H04R 2430/25; H04R 2499/13; H04R 1/403; H04R 1/406; H04R 3/12
See application file for complete search history.

(56) References Cited

U.S. PATENT DOCUMENTS

| | | | |
|---|---|---|---|
| 7,795,784 B2* | 9/2010 | Davidsen | B06B 1/0622 310/334 |
| 10,573,289 B2* | 2/2020 | Przybyla | H04R 17/00 |
| 2017/0236506 A1* | 8/2017 | Przybyla | G01S 15/10 367/103 |
| 2019/0222929 A1* | 7/2019 | Wijnings | H04R 3/005 |
| 2022/0091215 A1* | 3/2022 | Benezra | H04R 3/005 |

* cited by examiner

*Primary Examiner* — Daniel Pihulic

(57) ABSTRACT

A phase array acoustic device using array of horns and optional faceplates is presented. Said horn phased-array acoustic device can be used as a passive sensor, a sound projector, or both (sonar).

It is shown that by correct selection of the fill-factor and apodization faceplate, grating-lobes and side-lobes cab be greatly reduced.

An optional use of acoustic valves as phase-shifter in the wave domain to improve Signal to Noise Ratio is presented.

An optional aperiodic tiling of the horns' mouth to reduces aliasing is presented.

20 Claims, 6 Drawing Sheets

(0% fill factor)

(50% fill-factor)

(75% fill factor)

(90% fill-factor)

(95% fill factor)

(100% fill-factor)

(apodization)

(100% fill-factor with apodization)

(apodization)

(100% fill-factor with apodization)

ACOUSTIC HORN PHASED ARRAY

RELATED APPLICATIONS

This application is a non-provisional of and claims the benefit of the filing date of U.S. Provisional Patent Application 63/082,910 filed 24 Sep. 2020. The entire disclosure of which is herein incorporated by reference.

FILED OF TECHNOLOGY

The present invention is related, but not limited to, high gain steerable sound detection of Unmanned Arial Vehicles (UAV) in air or other media that benefits form horn impedance matching.

The present invention is also related, but not limited to, high gain steerable sound generation, in air or other media that benefits form horn impedance matching.

Examples include but not limited to: (i) the acoustic detection of Unmanned Aerial Vehicles (UAV, or drones) (ii) Long-Range Acoustic Device (LRAD), (iii) Sonar.

BACKGROUND

Note: throughout the application we may interchange the terms sound source and microphones for convenience Also note that in all cases we consider a planar wave front arriving at the array (assumes a distant target).

Horns are used in acoustics as a mean to match the impedance of the speaker or microphone membrane to the medium (usually air) improving the efficiency and providing directionally.

Array of microphones or speakers are used for beam forming. By changing the phase, summing or subtracting signals it is possible to create different beam patterns and to steer the beam (or a notch).

Analysis shows that for a point source and circular wave front the pitch or the distance between array element should be less the half the wavelength of sound (exact number depends on steering angle). Exceeding this pitch results with aliasing, which are also known as "grating-lobes"—highly undesirable side lobes at specific angular locations that can be almost as strong as the main lobe.

Keeping the pitch less than half wavelength limits the distance between array element to less than 10 mm (for the audible range).

What is needed is a method that benefit from both horns, including large horns, and arrays without introducing undesired affects such as aliasing and strong side-lobes.

In this invention we analyze array of horns, non-circular wavefronts and apodization, with respect to aliasing, side-lobes, beam steering, stereo, monopulse and beam (and notch) forming.

OBJECTS

It is an object of this invention to:
1. Show how to build arrays of horns in a controlled way that can minimize or eliminate grating-lobes and side-lobes including pitches larger than half a wavelength.
2. Show the derivation and analysis of beam steering using said array.
3. Show the derivation and analysis of beam formation and notch formation using said array.
4. Show the derivation and analysis of monopulse using array.
5. Show the derivation and analysis of stereo using pair of said horns.
6. Suggest alternative aperiodic arrangements of such arrays.
7. Suggest the use of acoustic valves for implementation phased array at the wave level.

BRIEF DESCRIPTION OF THE DRAWINGS

For a more complete understanding of the invention, reference is made to the following description and accompanying drawings, in which.

DETAILED DESCRIPTION

Figure 1:
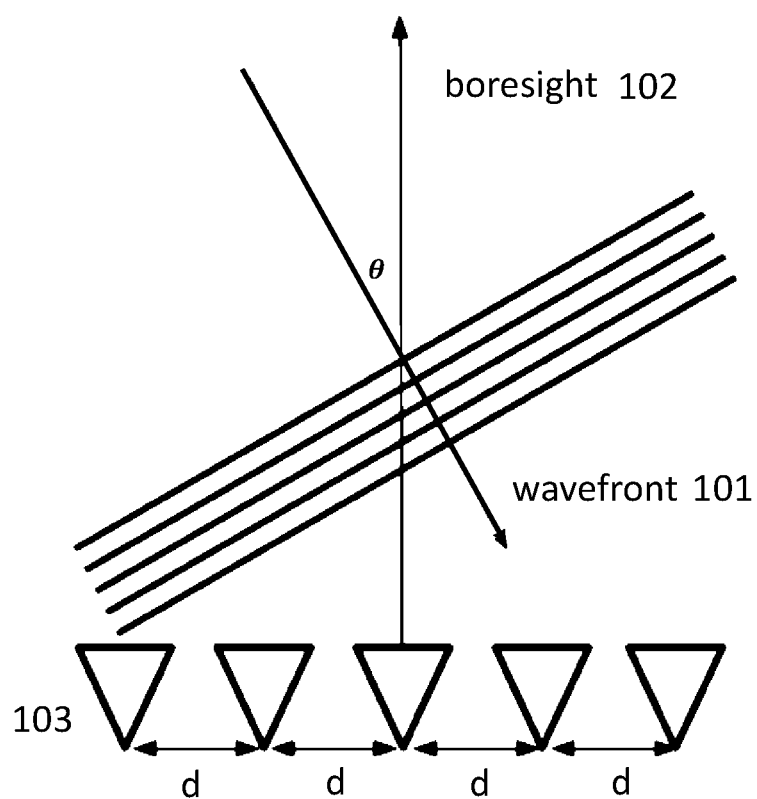
FIG. 1 Basic array configuration and notation.

FIG. 1 shows the basic configuration used in the analysis. For simplicity of the analysis, we assume a planar wavefront (101) arriving at angle θ relative to the boresight (102) at a linear array (103) of N elements with uniform displacement d.

The time delay between consecutive element is $$\frac{d \sin \theta}{C},$$

where C≈343 m/s is the speed of sound in air. The time delay induces a phase shift ΔΦ given the following equation:

$$\Delta\Phi = \frac{2\pi d \sin \theta}{\lambda} \quad (1)$$

where λ is the wavelength.

The beam angle θ as a function of the phase shift ΔΦ is given by:

$$\theta = \sin^{-1}\left(\frac{\Delta\Phi}{2\pi}\frac{\lambda}{d}\right) \quad (2)$$

The gain of a phased array detector at angle θ is given by:

$$G(\theta) = G_E(\theta) \cdot G_A(\theta) \quad (3)$$

where $G_E(\theta)$ is the linear gain of an individual element of the array at angle θ, and $G_A(\theta)$ is the array gain at beam angle θ in dB, which sums the individual elements according to their weight and assigned phase shift.

Note: Equation 3 indicates that the scanning range of an array is limited by beamwidth of individual elements. This creates a tradeoff between horn gain and array gain in practical designs.

The normalized array factor $AF(\theta)$, which describes the array pattern is given by:

$$AF(\theta) = \frac{\sin\left(\frac{N\pi d}{\lambda}[\sin\theta - \sin\theta_0]\right)}{N\sin\left(\frac{\pi d}{\lambda}[\sin\theta - \sin\theta_0]\right)} \quad (4)$$

where $\theta_0$ is the steering angle, N is the number of elements in the array and $AF(0):=1$.

Figure 2:
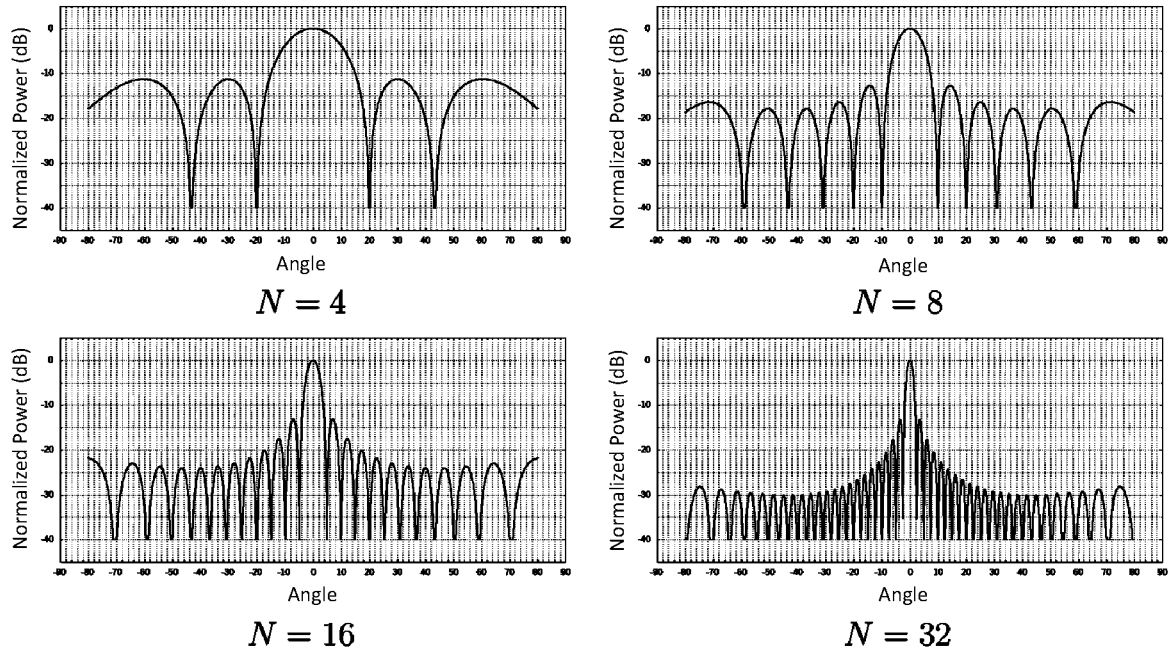
FIG. 2 Array Pattern at 5 $kH_z$, 50 mm displacement, and zero steering angle.

For example, FIG. 2 shows the array factor for F=5 k Hz, d=50 mm, $\theta_0$=0 and N∈[4,8,16,32]. We can see how the beamwidth of the main lobe becomes narrower as the array size and number of elements increases.

Equation 4 assumes equally weighted, uniformly spaced, point elements. For the analysis of an array of horns we use a more basic version of Equation 4:

$$AF(\theta) = \sum_{n=0}^{N} \int_{t=0}^{t_{max}} \sin(\omega t + \phi)\delta t \quad (5)$$

$$\phi = \frac{2\pi n d\ \sin(\theta - \theta_0)}{\lambda}$$

$$\omega = 2\pi f$$

where f is the frequency, t is time, and N, d, $\lambda$, $\theta$, and $\theta_0$ are the same as in Equation 4.

Equation 5 is equivalent (up to normalization) to Equation 4. However, it can be easily generalized in various ways. for example:

$$AF(\theta) = \sum_{n=0}^{N} W_c \int_{t=0}^{t_{max}} \sin(\omega t + \phi)\delta t \quad (6)$$

applies a weight $W_c$ to each element, in particular $w_i$=1, 0, -1 provides inclusion, exclusion and phase inversion of specific elements respectively.

Perturbation to the location of each element can be added by:

$$\phi = \frac{2\pi(nd + r_n)\sin(\theta - \theta_0)}{\lambda}$$

We can also weigh the aperture of each element and apply apodization by:

$$AF(\theta) = \sum_{n=0}^{N} \int_{a=-apr}^{+apr} ap(a) \int_{t=0}^{t_{max}} \sin(\omega t + \phi)\delta t \delta a \quad (7)$$

$$\phi = \frac{2\pi(nd + a)\sin(\theta - \theta_0)}{\lambda} \quad (8)$$

where ap(a) is the apodization function of the aperture [−apr . . . apr]. We use these equations in the following section.

Up to this point the beam angle $\theta$ was zero, and we saw no aliasing for $$\frac{\lambda}{2} < d = 50\ mm < \lambda.$$

The phase shift $\Delta\Phi$ in Equation 2 is periodic, we can therefore replace $\Delta\Phi$ in Equation 2 with $2\pi m+\Delta\Phi$ for m=0, ±1, ±2, ±3 . . . , resulting with:

$$\theta = \sin^{-1}\left(\frac{m2\pi + \Delta\Phi}{2\pi}\frac{\lambda}{d}\right) \quad (9)$$

Aliasing appears wear $$\theta \neq 0\ \text{and}\ \left(-1 \leq \left(\frac{m2\pi + \Delta\Phi}{2\pi}\frac{\lambda}{d}\right) \leq 1\right).$$

Aliasing results with undesired pattern lobes similar in gain to the main lobe at specific angles. To avoid aliasing entirely throughout the full 180 degrees scanning range, the distance between array elements must be equal or less than $$\frac{\lambda}{2}.$$

However, if the scan range is limited, and it usually is, the space between elements d can also be in the range $$\frac{\lambda}{2} \leq d \leq \lambda$$

with no aliasing, depending on the exact parameters.

Figure 3:
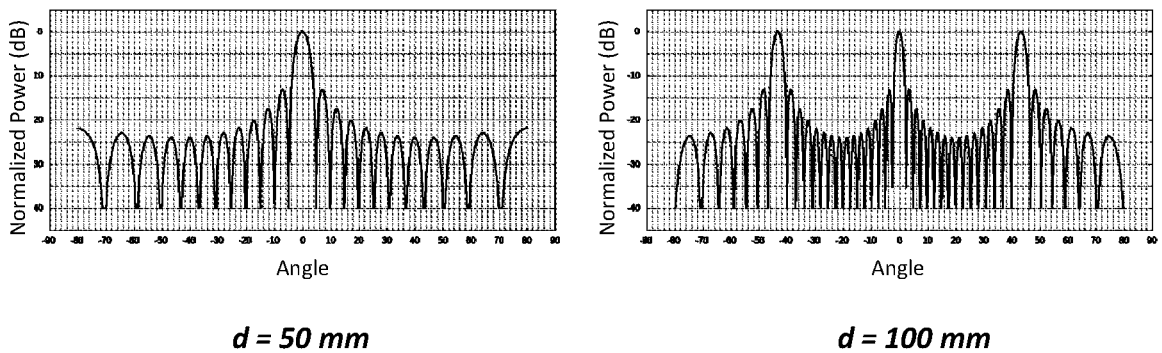
FIG. 3 Array Pattern at 5 $kH_z$, 50 mm, and 100 mm displacement, and zero steering angle.

For example, FIG. 3 shows $AF(\theta)$ for a frequency of 5 kHz ($\lambda \approx 68.6$ mm), received by an array of 16 elements, steered at 0, and having element spacing of 50 mm and 100 mm respectively. We can see that for $$\frac{\lambda}{2} \leq d = 50 \leq \lambda$$

there is no aliasing at steering angle 0, for d=100>$\lambda$ there is aliasing at $\approx \pm 43$ deg.

While it is possible to address aliasing programmatically, this is not desired as it not only increases the complexity of the system, it also reduces its efficiency and make it more vulnerable to jamming.

The horn's gain multiplies the array gain which is advantageous, especially for small arrays. However, the gain of the individual horn is a function of its aperture (Equation 10), and increasing the aperture of the horn also increases the distance between horn centers which could lead to aliasing as shown below.

$$G = A_e \frac{4\pi}{\lambda^2} \quad (10)$$

Figure 4:
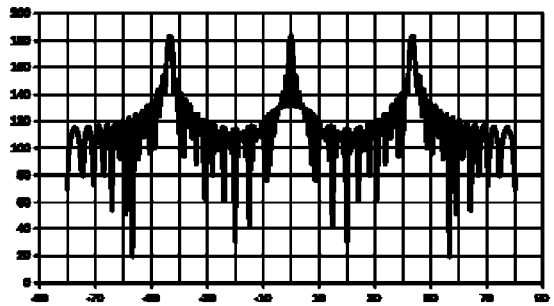
FIG. 4 Array pattern at 5 $kH_z$, 0 steering angle, d=100 mm spacing, and different fill factor with uniform apodization.
Figure 4:
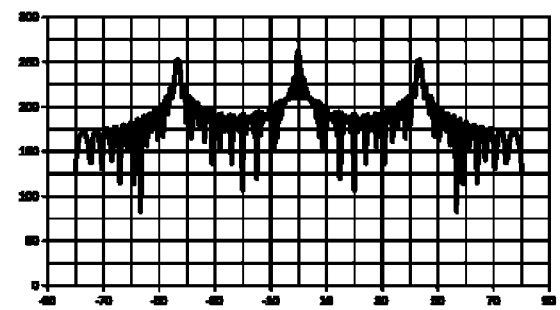
Figure 4:
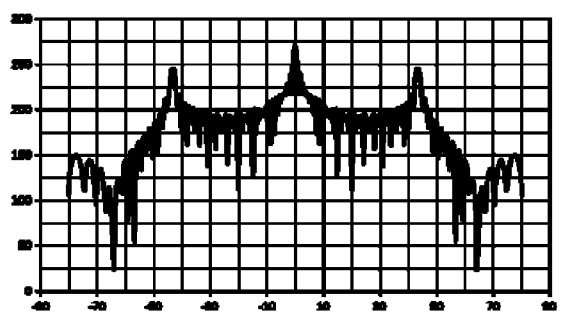
Figure 4:
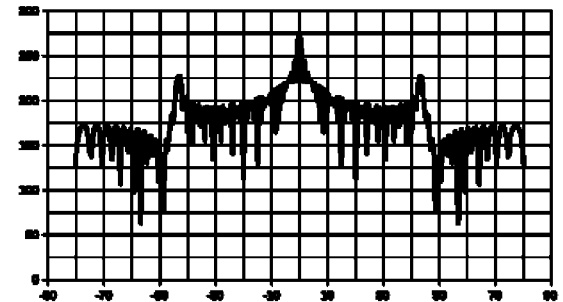
Figure 4:
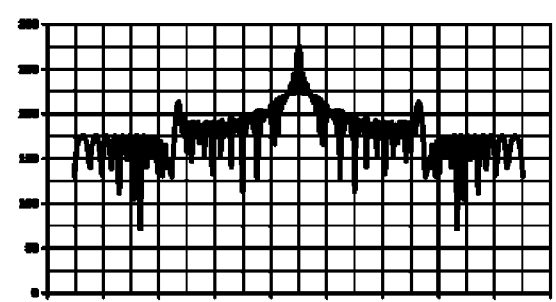
Figure 4:
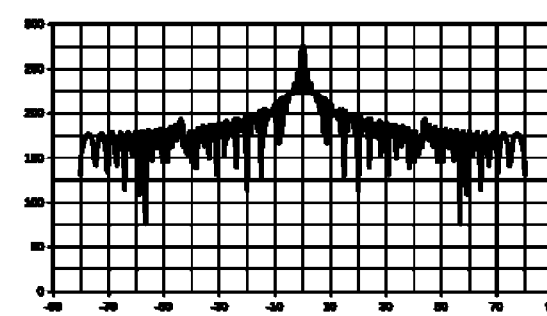

The fill-factor and apodization of the array of horns affects performance. FIG. 4 shows the array pattern for a linear array with different fill factors and N=32, d=0.1 m, F=5 kHz, and uniform apodization as computed by Equation 7. For fill-factor 0% (point elements), the array fill factor is the same as shown above, and we can see two clear grating-lobes.

As the fill-factor approaches 100%, the grating-lobes start to diminish until they are nearly eliminated at 100% fill-factor, thus using horns can reduce grating-lobes, but only at high fill factors.

Figure 5:
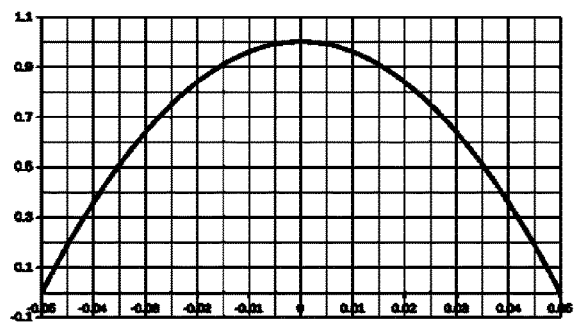
FIG. 5 Array pattern at 5 $kH_z$, 0 steering angle, d=100 mm spacing, and 100% fill factor and different quadratic apodization.
Figure 5:
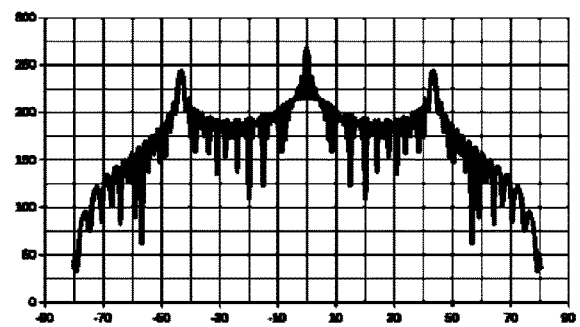
Figure 5:
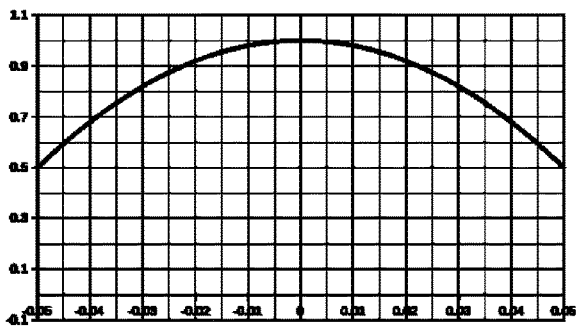
Figure 5:
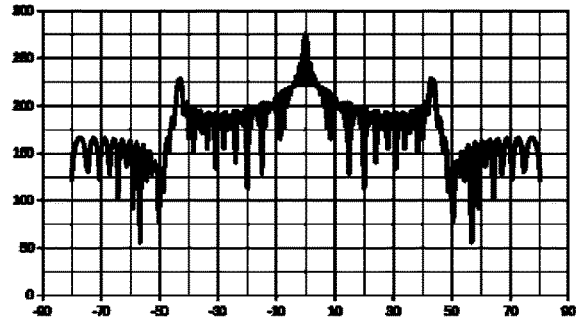

By applying apodization to the horn we can reduce the sidelobes as shown in FIG. 5. The Figure shows the array with 100% fill-factor and quadratic apodization. We can see a tradeoff between suppressing sidelobes and suppressing grating-lobes.

An apodization can be achieved by placing a faceplate over the horn mouth. For example, a faceplate having a grid of holes at radially varying diameters and spacing smaller than $$\frac{\lambda}{2}.$$

Dispersion or beam squint is the steering angle diversion of different frequencies from the beam angle of $f_0$, the frequency used to compute the steering angle $\theta_0$. The dispersion $\Delta\theta$ as a function of steering angle and frequency ratio is given by Equation 11

$$\Delta\theta = \sin^{-1}\left(\frac{f_0}{f}\sin\theta_0\right) - \theta_0 \tag{11}$$

The dispersion is not symmetric around the central frequency. Selecting $f_0$ at a lower frequency can be used to balance the dispersion.

The beamwidth at −3 dB power of a linear phased-array with N element at a distance d from each other is approximated as:

$$\theta_b \approx \frac{0.886\lambda}{Nd\cos\theta} \tag{12}$$

where $\lambda$ is the wavelength, and $\theta$ is the steering angle.

Increasing the array size and the number of elements of the array reduces the beam width and maintains a more uniform beamwidth over a larger range of steering angles.

Delay and sum (also known as shift and add in spatial domains) is a very simple beamforming algorithm. Give N input channels $x_i(t)$ the output signal y is computed as:

$$y = \sum_{i=0}^{N} w_i x_i(t + \delta_i) \tag{13}$$

where $w_i$ and $\delta_z$ are weight and time delay for channel i respectively.

For example: $w_i=1$ and $$\delta_i = \frac{id\sin\theta}{C}$$

is the beam steering at angle $\theta$. Setting $w_i=1$ for $$i \leq \frac{n}{2}$$

and $w_i=-1$ otherwise with the same Si creates a notch at an angle $\theta$.

When it is possible to get a reference noise signal, for example by using an auxiliary microphone, it is possible to reduce or cancel the noise using an adaptive filter framework which inverts and weighs the reference signal and sum it with the main signal.

Given a mixed-signal d(i) and a reference noise signal n(i), it is possible to estimate the unknown transfer function h(i) using an adaptive filter w(i). The coefficients of w(i) are usually found using an iterative algorithm such as Normalized Mean Square (NLMS) filter. Hardware implementations of the filter (in DSPs) are available.

The expected time delay for two point size microphones is given by Equation 14.

$$\delta t = \frac{d\sin\theta}{C_{T,Rh}} \tag{14}$$

where $\theta$ is the source angle (relative to the boresight), d is the distance between microphones, and $C_{T,Rh}$ is the speed of sound in air as a function of temperature and relative humidity (pressure has relatively little effect).

The direction of a point sound source can be determined from as little as two elements (stereo) by reversing Equation 14:

$$\sin\theta = \frac{\delta t C_{T,Rh}}{d} \tag{15}$$

Another way to find a sub-beamwidth accurate direction is Monopulse. By created three virtual beams—one at the beam angle, one slightly left, and one slight right, and compute the delta between left and right.

The ratio between the delta and sum channel $$\left(\frac{\Delta}{\Sigma}\right)$$

and the sign of the delta channel provide accurate localization within the range enclosed by the crossover points.

It is also possible to attenuate a sound source such as a jammer by creating a notch at the direction of the sound source. A notch is created by computationally "dividing" the array into two halves and subtracting one half from the other (phase invert and add).

While phase-shift can be done computationally after the signal is received by the microphone and digitized, there is an advantage of applying phase-shift and sum at the wave level before the signal is received by the microphone. The desired direction is amplified and undesired directions are attenuated. This can be done, for example, using acoustic valves—similar to the valves used in brass instruments.

Figure 6:
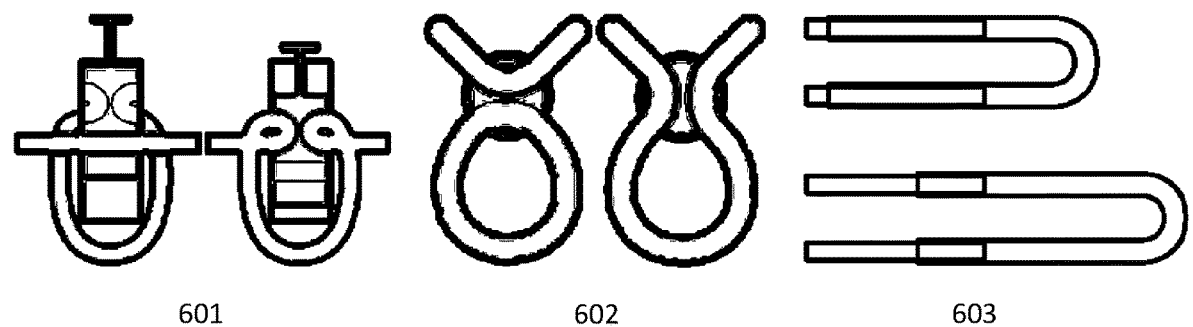
FIG. 6 Acoustic valves used in brass instruments.

FIG. 6 (901) and (902) act as discrete phase shifters (push button and rotary valves respectively) whereas (902) acts as a continues phase-shifter (slider).

Figure 7:
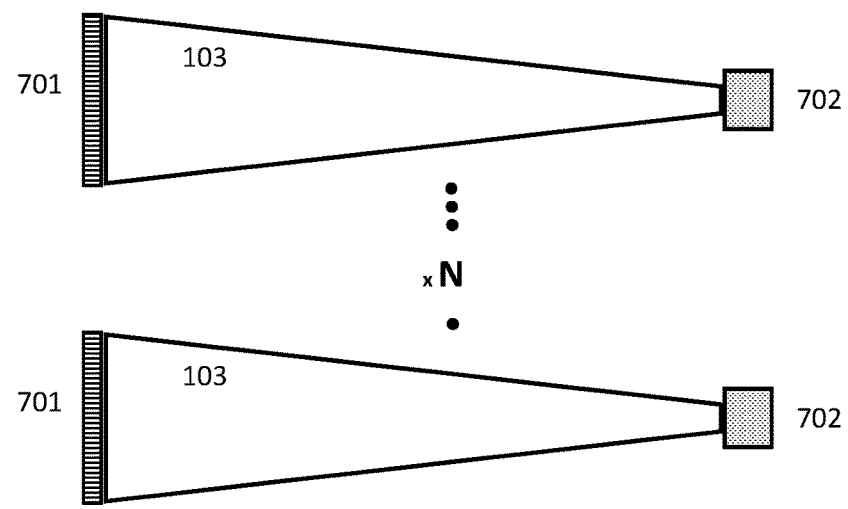
FIG. 7 An array comprises of N× (face plate, horn, microphone)

FIG. 7 shows one realization of the invention. In this realization the array comprises of N acoustic horns (103), each has an option faceplate (701) at the mouth of the horn to provide apodization and a microphone (702) at the throat of the horn.

The displacement d between horn is determined by the size of the horn and the fill-factor, where a high fill-factor reduces the magnitude of the grating-lobes. In this realization the phase shifting and sum or delta is done digitally by a computer after the signal is received by the microphones, digitized, and fed to the computer.

Figure 8:
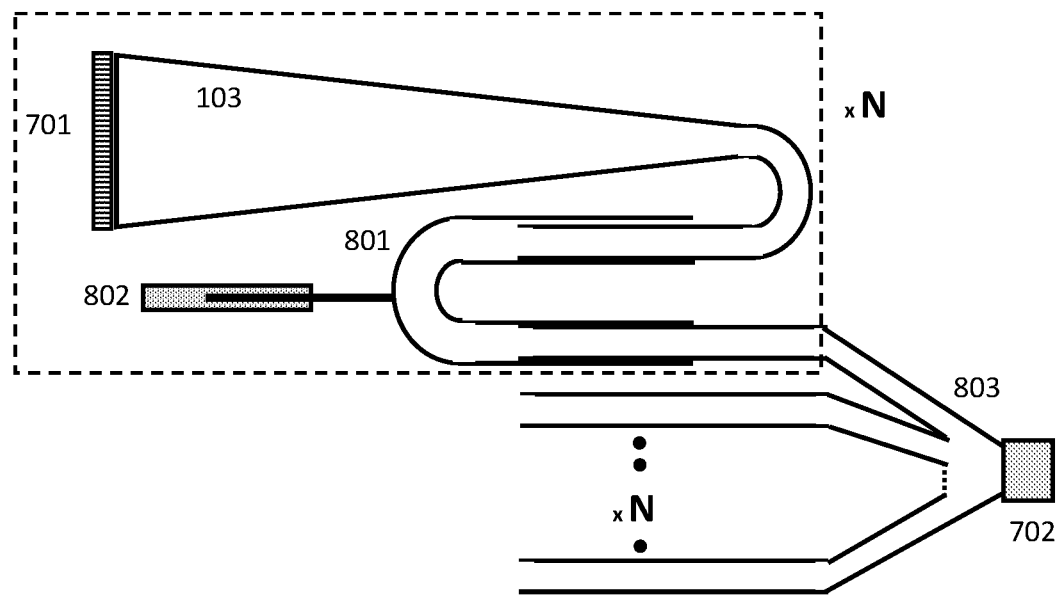
FIG. 8 An array comprises of N× (face plate, horn, phase-shifter with actuator) a mixer and a single microphone.

FIG. 8 shows a second realization of the invention. In this realization the array comprises of N acoustic horns (103), each has an optional faceplate (701) at the mouth of the horn to provide apodization and an acoustic phase-shifter (801) at the throat of the horn. The phase-shifter is controlled by an actuator (802) which is controlled by a computer.

As with the first realization, the displacement d between horns is determined by the size of the horn and the fill-factor, where a high fill-factor reduces the magnitude of the grating-lobes.

However, in this realization the phase shifting is done in the wave domain by the phase shifters. All waves are summed in the mixer (803) before the are received by a single microphone (702). Subtraction can be done by adding an acoustic phase inverter to a channel before it is mixed. After the signal is received by the microphone, it is digitized, and fed to the computer for processing.

A third realization of the invention is a combination of the first two. The array is divided into groups, each group has acoustic phase-shifters, a mixer and a microphone. However, additional computation between groups is done by the computer. This arrangement is useful for example to implement monopulse.

Figure 9:
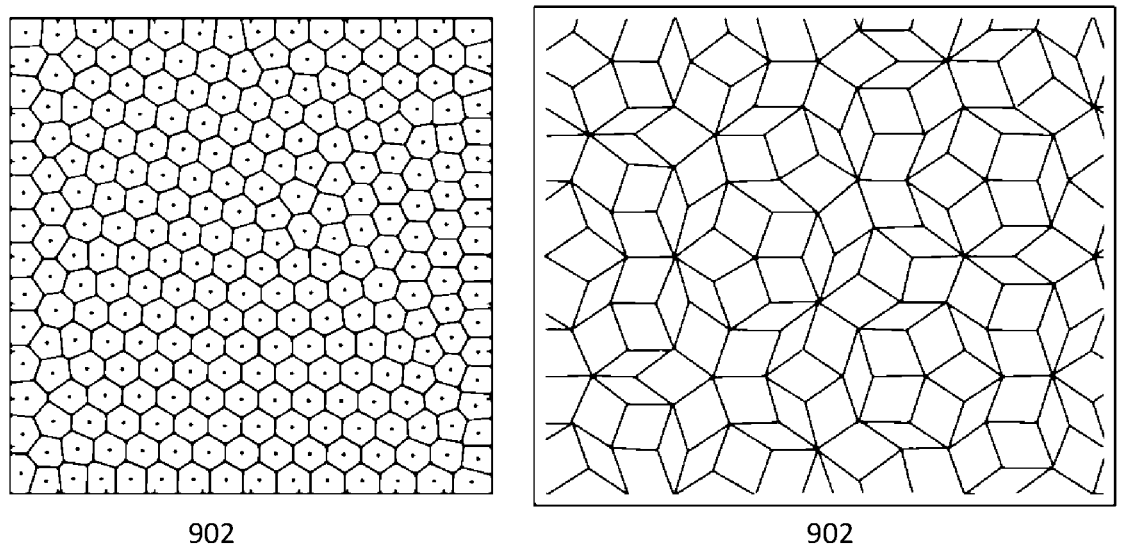
FIG. 9 Aperiodic tiling of a 100% fill-factor array.

Aperiodic tiling can be beneficial in reducing aliasing and side lobes. It is possible to tile the plane (having 100% fill-factor with no gaps or overlaps) for example, using a random perturbation of a regular grid and then Voronoi-tesselate the perturbed grid as shown in FIG. 9 (901), in this case, a Centroidal Voronoi Tessellation (CVT) is used. However, the number of tiles shapes is infinite, making it difficult to use in practice as each cell has its own weight and displacement from its neighbors.

Aperiodic tiling using a finite number of shapes and displacement is also possible, for example, the Penrose rhombus tiling is shown in FIG. 9 (902).

Having only two shapes and a small and finite number of edges to edge combination simplifies the calculations for practical implementation.

CONCLUSION

Phased array acoustic devices can be constructing using horns and apodisation faceplates, which provide higher gain while reducing or preventing grating-lobes by using large enough fill-factor and reducing side-lobes by using appropriate apodization.

Horns phased array can be used for beam (or notch) forming, mono-pulse and stereo (in pairs) in a similar way to array of bare microphones/sound sources.

There are tradeoff between horn gain and array gain and maximal steeble angle, aliasing and sidelobes. Dispersion is also factor to be considered.

The apodization faceplate is only one example of face plates. Other example include Fresnel zone faceplate that acts as a diffractive lens. In general other masks can be applied to the mouth of the horn (coded aperture).

Acoustic valves can be used as phase-shifters in the wave domain increasing the Signal to Noise Ratio before the signal is received by the microphone.

Aperiodic tiling (of horns' mouth) can reduce or eliminate aliasing.

What is claimed:

1. A phased array acoustic device comprising:
    a) N≥2 acoustic horns,
    b) M≥1 acoustic transducers,
    c) a digital computer interface,
    d) a digital computer,
    e) an optional K≥0 acoustic faceplates,
    f) an optional L≥0 acoustic phase shifters,
    g) an optional L actuators,
    h) optional R≥0 acoustic mixers;
    wherein: the fill-factor of the array, defined as the total area of horns' mouths divided by the area of the array, is greater than 50%;

$$AF(\theta) = \sum_{n=0}^{N} W_c \int_{t=0}^{t_{max}} \sin(\omega t + \phi)\delta t$$

AF(θ) is the normalized array factor,
θ is the angle of arrival relative to the boresight of the array,
$W_c$ is a weight for each element,
t is time,
ω is 2πf,
f is the frequency, $$\phi = \frac{2\pi(nd + r_n)\sin(\theta - \theta_0)}{\lambda}$$

λ is the wavelength,
$\theta_0$ is the boresight direction,
d is displacement of the horns, and
$r_n$ is a perturbation applied to each horn.

2. The acoustic device of claim 1, where M=N and L=0 and R=0.

3. The acoustic device of claim 1, where 1≤M<N and L=N and R=M.

4. The acoustic device of claim 1, where each of the M acoustic transducers is a receiver and the acoustic device is an acoustic sensor.

5. The acoustic device of claim 1, where each of the M acoustic transducers is an emitter and the acoustic device is an acoustic projector.

6. The acoustic device of claim 1, where each of the M acoustic transducers is a bi-directional receiver and emitter and the device is a sonar.

7. The acoustic device of claim 1, where each of the K faceplates is an apodization faceplate.

8. The acoustic device of claim 1, where each of the K faceplates is a Fresnel-Zone faceplate.

9. The acoustic device of claim 1, where the horns are tiled as a subset of an aperiodic tiling.

10. The acoustic device of claim 9, where aperiodic tiling is a Central Voronoi tiling or Rhombus Penrose tiling.

11. A phased array acoustic device comprising:
a) N≥2 acoustic horns,
b) M≥1 acoustic transducers,
c) a digital computer interface,
d) a digital computer,
e) an optional K≥0 acoustic faceplates,
f) an optional L≥0 acoustic phase shifters,
g) an optional L actuators,
h) optional R≥0 acoustic mixers;
wherein: the fill-factor of the array, defined as the total area of horns' mouths divided by the area of the array, is greater than 50%; and
weigh the aperture of each element and apply apodization by:

$$AF(\theta) = \sum_{n=0}^{N} \int_{a=-apr}^{+apr} ap(a) \int_{t=0}^{tmax} \sin(\omega t + \phi) \delta t \delta a$$

AF(θ) is the normalized array factor,
θ is the angle of arrival relative to the boresight of the array,
t is time,
ω is 2πf,
f is the frequency,
ap(a) is the apodization function of the aperture [−apr . . . apr], $$\phi = \frac{2\pi(nd + a)\sin(\theta - \theta_0)}{\lambda}$$

λ is the wavelength,
$\theta_0$ is the boresight direction, and
d is displacement of the horns.

12. The acoustic device of claim 11, where M=N and L=0 and R=0.

13. The acoustic device of claim 11, where 1≤M<N and L=N and R=M.

14. The acoustic device of claim 11, where each of the M acoustic transducers is a receiver and the acoustic device is an acoustic sensor.

15. The acoustic device of claim 11, where each of the M acoustic transducers is an emitter and the acoustic device is an acoustic projector.

16. The acoustic device of claim 11, where each of the M acoustic transducers is a bi-directional receiver and emitter and the device is a sonar.

17. The acoustic device of claim 11, where each of the K faceplates is an apodization faceplate.

18. The acoustic device of claim 11, where each of the K faceplates is a Fresnel-Zone faceplate.

19. The acoustic device of claim 11, where the horns are tiled as a subset of an aperiodic tiling.

20. The acoustic device of claim 19, where aperiodic tiling is a Central Voronoi tiling or Rhombus Penrose tiling.

* * * * *